United States Patent
Biegelsen et al.

(10) Patent No.: US 12,005,503 B2
(45) Date of Patent: Jun. 11, 2024

(54) BUILD PLATES FOR ADDITIVE MANUFACTURING SYSTEMS AND METHODS OF USING THE SAME

(71) Applicant: XEROX CORPORATION, Norwalk, CT (US)

(72) Inventors: David K. Biegelsen, Portola Valley, CA (US); Daniel Bullard, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/651,921

(22) Filed: Feb. 22, 2022

(65) Prior Publication Data

US 2022/0281009 A1    Sep. 8, 2022

Related U.S. Application Data

(63) Continuation-in-part of application No. 17/189,667, filed on Mar. 2, 2021, now Pat. No. 11,738,393.

(51) Int. Cl.
| | |
|---|---|
| *B22F 12/30* | (2021.01) |
| *B33Y 30/00* | (2015.01) |
| *B33Y 40/00* | (2020.01) |
| *C23F 1/02* | (2006.01) |
| *C23F 4/00* | (2006.01) |

(52) U.S. Cl.
CPC .............. *B22F 12/30* (2021.01); *B33Y 30/00* (2014.12); *B33Y 40/00* (2014.12); *C23F 1/02* (2013.01); *C23F 4/00* (2013.01)

(58) Field of Classification Search
None
See application file for complete search history.

(56) References Cited

U.S. PATENT DOCUMENTS

| | | | |
|---|---|---|---|
| 2008/0038922 A1* | 2/2008 | Lamers ............... | B81C 1/00595 |
| | | | 438/694 |
| 2011/0076785 A1 | 3/2011 | Xiao et al. | |
| 2011/0241947 A1* | 10/2011 | Scott ...................... | B22F 10/66 |
| | | | 428/156 |
| 2012/0057216 A1 | 3/2012 | Flores et al. | |
| 2016/0240003 A1 | 8/2016 | Frayne et al. | |
| 2018/0022044 A1* | 1/2018 | Dulkiewicz ............. | B29C 64/00 |
| | | | 425/375 |
| 2018/0361473 A1* | 12/2018 | Beacham ............... | B33Y 10/00 |
| 2019/0077054 A1* | 3/2019 | Jessen .................... | B33Y 30/00 |
| 2019/0160734 A1* | 5/2019 | Biesboer ............... | B29C 64/124 |
| 2019/0193155 A1 | 6/2019 | Olausson | |
| 2020/0061914 A1* | 2/2020 | Onishi ................... | B29C 64/393 |
| 2022/0068825 A1* | 3/2022 | Chen ...................... | H01L 24/14 |

OTHER PUBLICATIONS

Biegelsen et al., U.S. Appl. No. 17/189,667 entitled "Build Plates for Additive Manufacturing Systems and Methods for the Same," filed Mar. 2, 2021.
Author Unknown, "V-Flash User Guide," 2008, 201 pages.
Wikipedia, "Bolted Joint," https://web.archive.org/web/20100327222420/https://en.wikipedia.org/wiki/bolted_joint, downloaded on Feb. 6, 2023, 5 pages.

* cited by examiner

*Primary Examiner* — Farah Taufiq
(74) *Attorney, Agent, or Firm* — MH2 Technology Law Group LLP (57) ABSTRACT

A build plate is configured for use in a 3D printer. The build plate comprises a base comprising a base material and one or more vacuum channels. A removable plate is disposed proximate the base so as to be in fluid communication with the vacuum channels.

22 Claims, 7 Drawing Sheets

BUILD PLATES FOR ADDITIVE MANUFACTURING SYSTEMS AND METHODS OF USING THE SAME

RELATED DISCLOSURES

This disclosure is a continuation-in-part of U.S. patent application Ser. No. 17/189,667, filed Mar. 2, 2021, the disclosure of which is incorporated herein by reference in its entirety.

TECHNICAL FIELD

The presently disclosed embodiments or implementations are directed to build plates for additive manufacturing systems and method for the same.

BACKGROUND

Liquid metal jet printing, such as magnetohydrodynamic (MHD) liquid metal jet printing, includes ejecting liquid or molten metal drops from a printhead to a substrate, which may be a heated build plate or a previously deposited metal, to form a workpiece or printed article. As the metal drops contact the substrate, the metal drops cool and solidify to form the article. While systems and methods for liquid metal jet printing have made great progress, conventional systems and methods for separating the article and the build plate from one another often damage the article. For example, conventional methods to separate the article and the build plate may include fracturing or sawing the article from the build plate, which often damages complex and delicate features of the article proximal or adjacent to the build plate. Another conventional method to separate the article and the build plate may include quenching the article and the build plate in cold water and relying on a mismatch between the thermal contraction of the article and the build plate, which is a violent process that may potentially damage the article and shorten the useful lifetime of the build plate.

High temperature vacuum chucks are generally known for use in certain technologies. For example, vacuum chucks are known for processing semiconductor wafers during semiconductor wafer fabrication.

Improved build plates and methods of using the same for additive manufacturing, such as for use in liquid metal jet 3D printing systems, would be a step forward in the art.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure may provide a build plate for an additive manufacturing device including a base and a sacrificial plate coupled with the base. The etch rate of the sacrificial plate in an etchant may be greater than an etch rate of the base in the etchant.

In some examples, the build plate may be configured to support a 3D printed article. The etch rate of the sacrificial plate in the etchant may be greater than an etch rate of the 3D printed article in the etchant.

In some examples, a ratio of the etch rate of the sacrificial plate to the etch rate of the base may be greater than or equal to about 10.

In some examples, a ratio of the etch rate of the sacrificial plate to the etch rate of the base may be greater than or equal to about 100.

In some examples, the sacrificial plate may include one or more protuberances extending through at least a portion of the base and configured to at least partially couple the sacrificial plate with the base.

In some examples, the one or more protuberances may extend through an entire dimension of the base.

In some examples, at least one of the protuberances may define threading configured to facilitate the coupling of the sacrificial plate with the base.

In some examples, the one or more protuberances may extend through a portion of the base.

In some examples, the base and the sacrificial plate may be coupled with one another via a vacuum pressure.

In some examples, the base and the sacrificial plate may be coupled with one another via one or more mechanical fasteners.

In some examples, the mechanical fasteners may include one or more of a threaded stud, a bolt, a clamp, or combinations thereof.

In some examples, the sacrificial plate may have or include a thickness of from about 0.1 µm to about 5 mm.

In some examples, the sacrificial plate may be coupled with the base via electroplating, electroless plating, chemical bonding, or dip coating.

The present disclosure may provide an additive manufacturing layering device including a print head and any build plate disclosed herein disposed proximal the print head.

The present disclosure may provide a method for separating a 3D printed article and a build plate from one another. The 3D printed article may be coupled with the sacrificial plate of the build plate. The method may include contacting the sacrificial plate with the etchant.

In some examples, the method may further include separating the sacrificial plate and the base of the build plate from one another prior to contacting the sacrificial plate with the etchant.

In some examples, contacting the sacrificial plate with the etchant may include disposing the sacrificial plate and the 3D printed article coupled therewith in a vessel containing the etchant.

In some examples, an inner surface of the vessel may define a recess configured to support the sacrificial plate.

In some examples, the method may further include disposing a support in the vessel. The support may be configured to support the 3D printed article upon separation from the sacrificial plate.

In some examples, the sacrificial plate may be disposed in the vessel such that the sacrificial plate defines an upper volume and a lower volume in the vessel. The sacrificial plate may substantially prevent fluid communication between the upper volume and the lower volume. The etchant may be disposed in the upper volume In an implementation, the present disclosure is directed to a build plate configured for use in a 3D printer. The build plate comprises a base comprising a base material and one or more vacuum channels. A removable plate is disposed proximate the base so as to be in fluid communication with the vacuum channels.

In another implementation, the present disclosure is direct to a three-dimensional (3D) printer. The 3D printer comprises a printhead. A stage is disposed proximal the printhead, the stage comprising a build plate. The build plate comprises: a base comprising a base material and one or more vacuum channels; and a removable plate disposed proximate the base so as to be in fluid communication with the vacuum channels. The 3D printer further comprises a computer controlled motion system that allows the printhead and the stage to move in three dimensions relative to each other during operation of the 3D printer.

In yet another implementation, the present disclosure is directed to a method of removing a three-dimensional (3D) printed article from a sacrificial plate of a build plate. The method comprises: providing the three-dimensional (3D) printed article coupled to the sacrificial plate; and etching the sacrificial plate with an etchant until the sacrificial plate is removed from the 3D printed article.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

DETAILED DESCRIPTION

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure is directed to build plates for additive manufacturing devices or 3D printers, and methods for the same. Particularly, the present disclosure is directed to improved build plates for 3D printers and methods for removing 3D printed articles from the build plates without damaging the 3D printed articles. As further described herein, the improved build plates may include or be at least partially fabricated from a sacrificial material capable of or configured to be etched, solvated, or otherwise dissolved in a solution (e.g., etchant) to separate the 3D printed article attached to the build plate.

Figure 1:
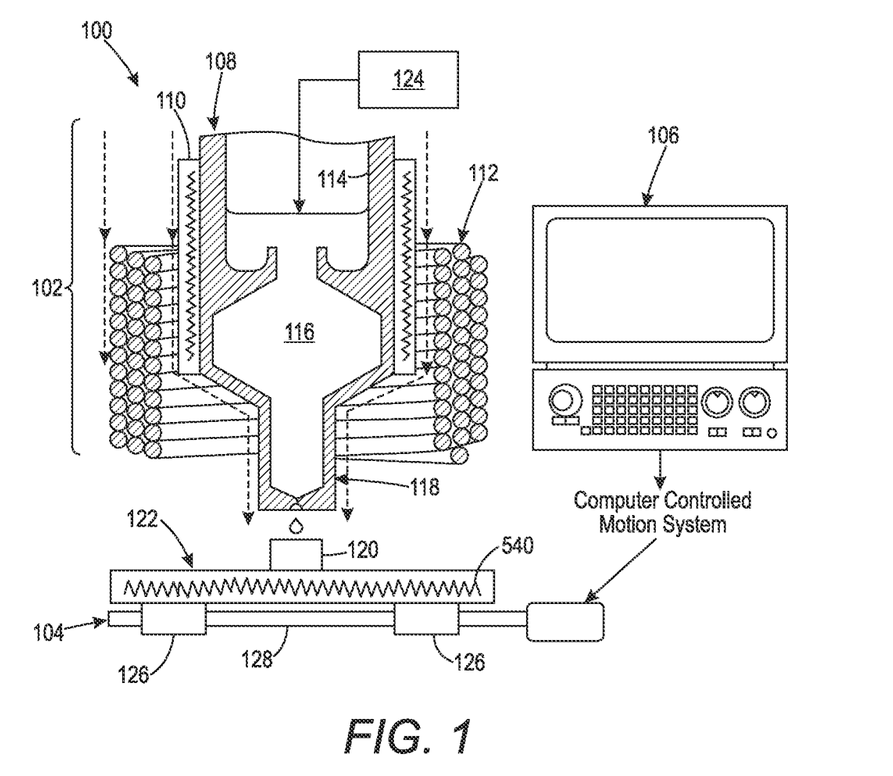
FIG. 1 illustrates a schematic cross-sectional view of an exemplary additive manufacturing layering device or 3D printer, according to one or more implementations disclosed.

FIG. 1 illustrates a schematic cross-sectional view of an exemplary additive manufacturing layering device or 3D printer 100, according to one or more implementations. The 3D printer 100 may be a liquid metal jet printing system, such as a magnetohydrodynamic (MHD) printer. It should be appreciated, however, that any additive manufacturing device and any printable material may utilize the implementations disclosed herein. The 3D printer 100 may include a printhead 102, a stage 104, a computing system 106, or any combination thereof. The computing system 106 may be operably and/or communicably coupled with any one or more of the components of the 3D printer 100. The computing system 106 may be capable of or configured to operate, modulate, instruct, receive data from, or the like from any one or more of the components of the 3D printer 100. The printhead 102 may include a body 108, which may also be referred to herein as a pump chamber, one or more heating elements (one is shown 110), one or more metallic coils 112, other means for ejecting molten or melted droplets, or any combination thereof, operably coupled with one another. As illustrated in FIG. 1, the heating elements 110 may be at least partially disposed about the body 108, and the metallic coils 112 may be at least partially disposed about the body 108 and/or the heating elements 110. The body 108 may have an inner surface 114 defining an inner volume 116 thereof. The body 108 may define a nozzle 118 disposed at a first end portion of the body 108.

The stage 104 may be disposed proximal the printhead 102 and capable of or configured to support a workpiece or article 120 formed or fabricated by the 3D printer 100. For example, as illustrated in FIG. 1, the stage 104 may include a platen (e.g., heated platen) or a build plate 122 disposed below the printhead 102 and capable of or configured to support the article 120 fabricated by the 3D printer 100. The build plate 122 may be detachable from the stage 104. As further described herein, the build plate 122 may include one or more features capable of or configured to facilitate the removal of the article 120 from the build plate 122. The 3D printer 100 includes a computer controlled motion system that is capable of providing movement of the printhead and the build plate in three dimensions relative to each other during operation of the 3D printer. The motion system can comprise, for example, one or more actuators 126 (FIG. 1) that can function as movers for positioning the build plate 122 and printhead 102 relative to each other using, for example, a system comprising tracks 128. Any other type of computer controlled motion system can also be employed. The computer controlled motion system can be designed to move the build plate 122 alone, the printhead 102 alone or both the build plate 122 and printhead 102 in order to provide the relatively movement of the printhead 102 and the build plate 122 in three dimensions with respect to each other.

In an exemplary operation of the 3D printer 100 with continued reference to FIG. 1, a build material (e.g., metal) from a source 124 may be directed to the inner volume 116 of the body 108. The heating elements 110 may at least partially melt the build material contained in the inner volume 116 of the body 108. For example, the build material may be a solid, such as a solid metal, and the heating elements 110 may heat the body 108 and thereby heat the build material from a solid to a liquid (e.g., molten metal). The metallic coils 112 may be coupled with a power source (not shown) capable of or configured to facilitate the deposition of the build material on the build plate 122. For example, the metallic coils 112 and the power source coupled therewith may be capable of or configured to generate a magnetic field, which may generate an electromotive force within the body 108, thereby generating an induced electrical current in the molten metal disposed in the body 108. The magnetic field and the induced electrical current in the molten metal may create a radially inward force on the liquid metal, known as a Lorentz force, which creates a pressure at the nozzle 118. The pressure at the nozzle 118 may expel the molten metal out of the nozzle 118 toward the build plate 122 in the form of one or more drops. The drops may then cool and solidify to thereby adhere to the build plate 122 and form at least a portion of the article 120.

Figure 2A:
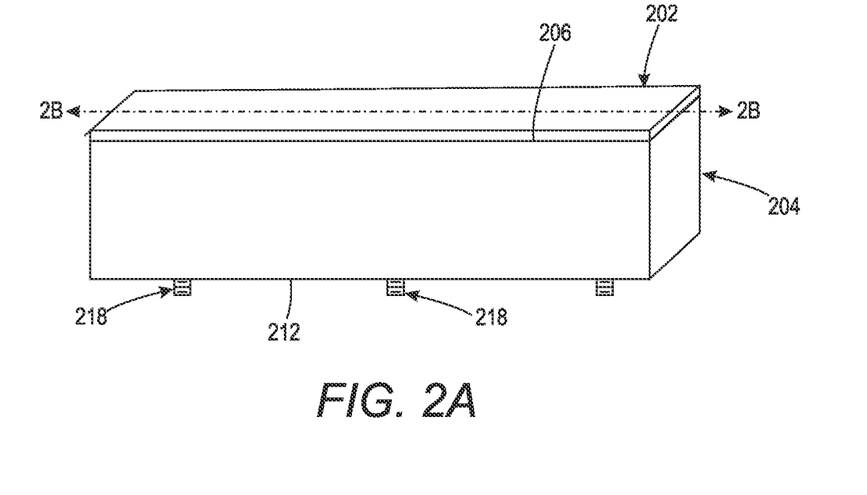
FIG. 2A illustrates a perspective view of an exemplary build plate including a sacrificial plate and a base that may be utilized in the 3D printer of FIG. 1, according to one or more implementations disclosed.
Figure 2B:
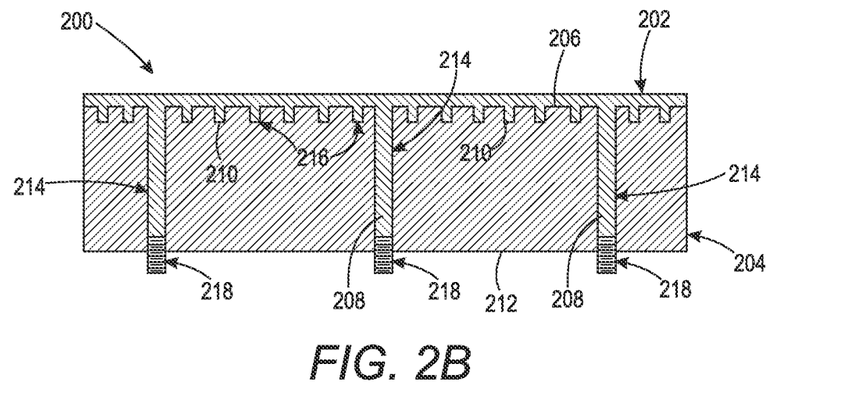
FIG. 2B illustrates a cross-sectional view of the exemplary build plate of FIG. 2A, according to one or more implementations disclosed.

FIG. 2A illustrates a perspective view of an exemplary build plate 200 that may be utilized in the 3D printer 100 of FIG. 1, according to one or more implementations. FIG. 2B illustrates a cross-sectional view of the exemplary build plate 200 of FIG. 2A, according to one or more implementations. As illustrated in FIGS. 2A and 2B, the build plate 200 may include a sacrificial plate 202 and a base 204. The sacrificial plate 202 may be disposed adjacent at least a portion of the base 204 such that the sacrificial plate 202 at least partially covers a surface 204 thereof. For example, as illustrated in FIG. 2A, the sacrificial plate 202 may at least partially cover a top surface 206 of the base 204. The sacrificial plate 202 may have a thickness of from about 0.1 µm to about 5 mm, such as any of the thicknesses described herein for sacrificial plates or sacrificial layers. In an implementation, the sacrificial plate 202 has a thickness ranging from about 0.1 mm to about 5 mm.

The sacrificial plate 202 and the base 204 may be coupled with one another. In at least one implementation, the sacrificial plate 202 and the base 204 may be detachably coupled with one another. It should be appreciated that the sacrificial plate 202 and the base 204 may be detachably coupled with one another via any suitable means. For example, the sacrificial plate 202 and the base 204 may be detachably coupled with one another via one or more mechanical fasteners. Illustrative mechanical fasteners may be or include, but are not limited to, one or more bolts, studs and nuts, clamps, threaded studs, and/or any other known mechanical fasteners. In another example, the sacrificial plate 202 and the base 204 may be bonded with one another (e.g., metallurgically bonded, chemically bonded, etc.). In another example, the sacrificial plate 202 and the base 204 may be coupled with one another by vacuum pressure. The vacuum pressure may include utilizing a vacuum pressure from a vacuum source less than the ambient pressure such that the vacuum pressure is capable of or configured to couple the sacrificial plate 202 and the base 204 with one another. Examples of a build plate comprising vacuum channels and an optional porous layer that can be used for employing vacuum pressure to bond the sacrificial plate 202 to the base 204 is shown and described below with respect to FIGS. 5 and 6.

In an exemplary implementation, illustrated in FIGS. 2A and 2B, the sacrificial plate 202 may include one or more protuberances 208, 210 capable of or configured to facilitate the coupling with the base 204. The sacrificial plate 202 may include any number of protuberances 208, 210 sufficient to couple the sacrificial plate 202 with the base 204. The one or more protuberances 208, 210 of the sacrificial plate 202 may extend through at least a portion of the base 204. In at least one implementation, the sacrificial plate 202 may include at least one protuberance 208 extending through the base 204. For example, as illustrated in FIG. 2B, the sacrificial plate 202 may include at least one protuberance 208 extending through the entire dimension (e.g., thickness, length, width, depth) of the base 204. In another example, illustrated in FIG. 2B, the sacrificial plate 202 may include at least one protuberance 210 extending partially through the base 204. The protuberances 208 extending through the entire dimension of the base 204 may allow the sacrificial plate 202 to be clamped or fastened proximal a bottom surface 212 of the base 204 to thereby facilitate the coupling of the sacrificial plate 202 with the base 204. The protuberances 208, 210 may at least partially prevent separation or movement between the sacrificial plate 202 and the base 204. For example, the protuberances 208, 210 may prevent lateral movement or sliding between the sacrificial plate 202 and the base 204.

The base 204 may define one or more holes 214, 216 at least partially extending therethrough from the top surface 206 toward the bottom surface 212 thereof. As illustrated in FIG. 2B, at least one of the holes 204 may extend through the entire dimension of the base 202 from the top surface 206 to the bottom surface 212 to thereby provide through holes 214. As further illustrated in FIG. 2B, at least one of the holes 216 may only extend partially through the base 204 to thereby provide blind holes or pockets 216.

The one or more holes 214, 216 may be capable of or configured to receive the one or more protuberances 208, 210 to facilitate the coupling between the sacrificial plate 202 and the base 204. The size and/or shape of the one or more holes 214, 216 and/or the protuberances 208, 210 may be controlled or modified to facilitate the coupling between the sacrificial plate 202 and the base 204. For example, the one or more holes 214, 216 may be sized and/or shaped to provide a friction or interference fit with the respective protuberances 208, 210 of the sacrificial plate 202.

The one or more protuberances 208, 210 may be capable of or configured to facilitate the coupling of the sacrificial plate 202 and the base 204 with one another. For example, the one or more protuberances 208, 210 may be sized and/or shaped to provide a friction or interference fit with the respective holes 214, 216 of the base 204. In another example, the one or more protuberances 208, 210 may include one or more mechanical or physical features capable of or configured to facilitate the coupling of the sacrificial plate 202 with the base 204. For example, as illustrated in FIG. 2B, one or more of the protuberances 208, 210 may include or define crush ribs or threading 218 along respective lengths thereof to thereby provide an interference or press fit between the sacrificial plate 202 and the base 204. The threading 218 may exert a radial force or load against the base 204 to thereby provide the interference fit between the protuberances 208 and the base 204. While not illustrated, it should be appreciated that the holes 214, 216 of the base 204 may include or define crush ribs or threading (not shown) to thereby provide an interference fit with the protuberances 208, 210.

Figure 2C:
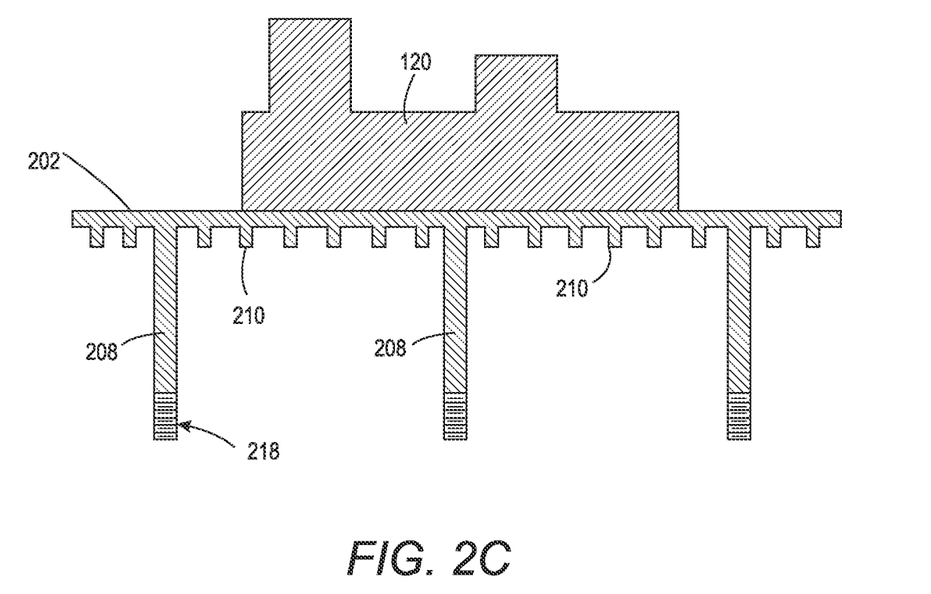
FIG. 2C illustrates a cross-sectional view of the sacrificial plate of FIG. 2A separated from the base and supporting a 3D printed article, according to one or more implementations disclosed.

FIG. 2C illustrates a cross-sectional view of the sacrificial plate 202 of FIG. 2A separated from the base 204 and supporting the article 120, according to one or more implementations. The sacrificial plate 202 may be separated from the base 204 through any suitable means. For example, the sacrificial plate 202 and the base 204 may be separated from one another by applying a biasing force or load in opposing directions. In another example, the sacrificial plate 202 and the base 204 may be separated from one another by removing any mechanical fasteners (e.g., clamps) coupling the sacrificial plate 202 and the base 204 with one another.

In at least one implementation, the build material of the article 120 (e.g., build material disposed in the source 124) may be or include one or more metals (e.g., pure metals or alloys). Illustrative build materials may be or include, but are not limited to, aluminum, aluminum alloys, brass, bronze, chromium, chromium alloys, cobalt-chrome alloys, copper, copper alloys, iron alloys (Invar), nickel, nickel alloys (INCONEL®), nickel-titanium alloys (Nitinol), stainless steel, tin, tin alloys, titanium, titanium alloys, gold, gold alloys, silver, silver alloys, molybdenum, molybdenum alloys, tungsten, tungsten alloys or the like, or any combination thereof.

The base 204 may be fabricated from one or more metals. Illustrative metals may be or include, but are not limited to, aluminum, aluminum alloys, brass, bronze, chromium, chromium alloys, cobalt, cobalt alloys, cobalt-chrome alloys, copper, copper alloys, iron, iron alloys (e.g., INVAR), nickel, nickel alloys (e.g., INCONEL®), nickel-titanium alloys (NITINOL), stainless steel, tin, tin alloys, titanium, titanium alloys, gold, gold alloys, silver, silver alloys, molybdenum, molybdenum alloys, tungsten and tungsten alloys, or any combination thereof. In an exemplary implementation, the base 204 is fabricated from aluminum or alloys thereof.

The sacrificial plate 202 may be fabricated from one or more sacrificial materials, an alloy incorporating one or more sacrificial materials, and/or a composite incorporating one or more sacrificial materials. The sacrificial materials may have an etch rate relatively greater than an etch rate of the article 120 and/or the base 204. For example, the sacrificial materials of the sacrificial plate 204 may have an etch rate at least 50% greater, at least 75% greater, at least 100% greater, at least 500% greater, at least 1,000% greater, at least 5,000% greater, or at least 10,000% greater than the article 210 and/or the base 204. Illustrative sacrificial materials may be or include, but are not limited to, metals and metal oxides. Illustrative metals and metal oxides may be or include, but are not limited to, copper, copper alloys, tantalum, tantalum alloys, aluminum, aluminum alloys, chromium, chromium alloys, gallium, gallium alloys, germanium, germanium alloys, gold, gold alloys, hafnium, hafnium alloys, indium, indium alloys, indium tin oxide, iron, iron alloys, iron oxide, copper oxide, magnesium, magnesium oxide, niobium, niobium alloys, nichrome, nickel, nickel alloys, palladium, palladium alloys, tin, tin alloys, titanium, titanium alloys, tungsten and tungsten alloys, or combinations thereof, or combinations and/or alloys thereof. In an exemplary implementation, the sacrificial plate 202 is fabricated from copper (e.g., is made of copper or copper alloys). In another implementation, the sacrificial plate 202 may be a composite. For example, the sacrificial plate 202 may be copper or copper alloy that is plated with aluminum or aluminum alloy.

The materials utilized in the base 204 and/or the article 120 (i.e., build material of the source 124) may be different from the sacrificial material utilized for the sacrificial plate 202. In at least one implementation, the respective materials utilized in the base 204 and/or the article 120 may be determined, at least in part, by a ratio of an etch rate or etch rate ratio between the sacrificial material and the material utilized for the base 204 and/or the article 120. As used herein, the term or expression etch rate may refer to a rate in which a portion (e.g., a layer or layers) of a material is removed in the presence of an etchant or suitable solution (e.g., solvent). It should be appreciated that the etch rate may be at least partially determined by the material, the etchant or suitable solution, temperature of the etchant, other conditions (e.g., voltage, current, circulation, sonication, etc.), or combinations thereof. An etch rate ratio of the sacrificial materials utilized in the sacrificial plate 202 relative to the respective materials utilized in the base 202 and/or the article 120 may be greater than or equal to about 10, greater than or equal to about 20, greater than or equal to about 40, greater than or equal to about 100, greater than or equal to about 200, greater than or equal to about 300, greater than or equal to about 500, greater than or equal to about 1,000, greater than or equal to about 1,500, greater than or equal to about 3,000, greater than or equal to about 5,000, greater than or equal to about 7,000, greater than or equal to about 9,000, or greater than or equal to about 10,000, in a select solution (e.g., etchant), and/or under one or more conditions (e.g., heating, anodic or cathodic current, etc.).

In at least one implementation, the respective materials utilized for the article 120, the base 204, and/or the sacrificial plate 202 (e.g., the sacrificial material) may have similar or substantially similar thermal expansion coefficients (TCE). It should be appreciated that utilizing materials with similar or substantially similar TCEs may reduce or mitigate undesirable stress on the article 120, the base 204, and/or the sacrificial plate 202 during temperature changes or cycles.

In an exemplary operation of the 3D printer 100 with continued reference to FIGS. 1 and 2A-2C, the base 204 and the sacrificial plate 202 may be coupled with one another via the protuberances 208, 210 or any other suitable mechanical fasteners, as illustrated in FIGS. 2A and 2B. The 3D printer 100 may then fabricate and affix the article 120 on the build plate 200 and adjacent the sacrificial plate 202 thereof. After fabricating the article 120 on the build plate 200, the sacrificial plate 202 may be separated from the base 204 by applying a biasing force or load on the sacrificial plate 202 and the base 204 in opposing directions. The base 204 may be reused by coupling another sacrificial plate 202 therewith (e.g., via interference fit, clamp, etc.). After separation, the sacrificial plate 202 and the article 120 coupled therewith may be processed to separate the sacrificial plate 202 and the article 120 from one another. It should be appreciated that in at least one implementation, the sacrificial plate 202 may not be separated from the base 204 prior to separating the sacrificial plate 202 and the article 120 from one another. For example, the base 204 and the sacrificial plate 202 may be coupled with one another while removing or separating the article 120 from the sacrificial plate 202.

In at least one implementation, the sacrificial plate 202 and the article 120 may be separated from one another by any process capable of or configured to etch the sacrificial plate 202. For example, the sacrificial plate 202 and the article 120 may be separated from one another by wet or chemical etching with a liquid etchant or reactant, gaseous etching with a gas or vaporized etchant or reactant, plasma etching with a plasma formed with a gaseous etchant or reactant, electrochemical etching or electroetching, or any combination thereof. It should be appreciated that any etching process may be utilized and the particular etching process selected may be at least partially determined by the etch rate (e.g., Å/min, cycles, etc.), geometry (e.g., size and/or shape) of the article 120 and/or the sacrificial plate 202, exposed surface of the article 120 and/or the sacrificial plate, selectivity of the etching for the sacrificial plate 202 relative to the base 204 and/or the article 120, or the like, or any combination thereof.

In an exemplary implementation, the sacrificial plate 202 and the article 120 are separated from one another by wet or chemical etching. For example, the sacrificial plate 202 may be contacted with an etchant to remove layers thereof to thereby separate or release the article 120. In at least one implementation, the sacrificial plate 202 and the article 120 coupled therewith may be at least partially immersed in the etchant disposed in a vessel.

Figure 3:
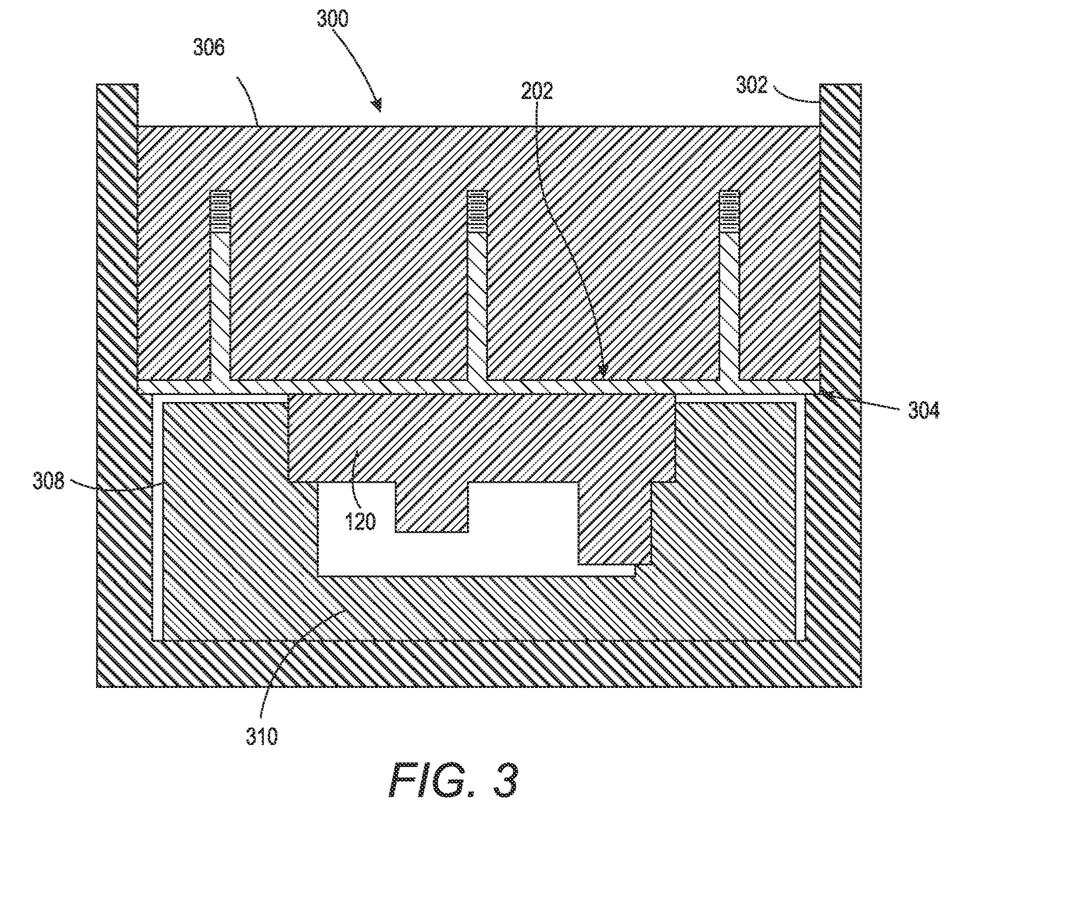
FIG. 3 illustrates the sacrificial plate and the article disposed in an exemplary vessel containing a suitable etchant, according to one or more implementations disclosed.

FIG. 3 illustrates the sacrificial plate 202 and the article 120 disposed in an exemplary vessel 300 containing a suitable etchant, according to one or more implementations. The vessel 300 may be sized and/or shaped to receive the sacrificial plate 202 and/or the article 120. In at least one implementation, illustrated in FIG. 3, an inner surface 302 of the vessel 300 may define a ledge or recess 304 capable of or configured to support the sacrificial plate 202. As further illustrated in FIG. 3, the sacrificial plate 202 may be disposed in the vessel 300 such that the sacrificial plate 202 at least partially defines an upper volume 306 and a lower volume 308 of the vessel 300. In at least one implementation, the vessel 300 may be sized and/or shaped such that the sacrificial plate 202 and the inner surface 302 of the vessel 300 at least partially form a fluid tight seal therebetween. For example, the sacrificial plate 202 may be disposed in the vessel 300 such that the upper volume 306 and the lower volume 308 of the vessel 300 are not substantially in fluid communication with one another. The recess 304 and/or a contact area at the periphery of the article 120 may provide adequate sealing either with or without the aid of a suitable gasket. As such, an etchant disposed in the upper volume 306 may not readily flow to the lower volume 308 of the vessel 300.

In an exemplary implementation, illustrated in FIG. 3, the vessel 300 may include an optional support 310 capable of or configured to support the article 120 after separation from the sacrificial plate 202. The support 310 may be sized and/or shaped to receive the article 120. For example, the size and/or shape of the support 310 may be at least partially dependent on the size and/or shape of the article 120 to thereby adequately support the article 120. The support 310 may be removeable or detachable from the vessel 300. In at least one implementation, the support 310 may be disposable. In another implementation, the support 310 may be reusable. The support 310 may be fabricated from a material having an etch rate substantially similar to or less than the article 120, the base 204, and/or the vessel 300. In an exemplary implementation, the support 310 may be fabricated from one or more polymeric materials. For example, the support 310 may be a 3D-printed, a machined, or a molded polymer support. Similarly, if the build material of the article 120 is a polymer, the support 310 (e.g., reusable support) may be fabricated from a metal or a polymer having relatively lower etch rate as compared to the article 120.

In an exemplary operation with continued reference to FIG. 3, the sacrificial plate 202 and the article 120 coupled therewith may be disposed in the vessel 300. The sacrificial plate 202 may form a substantially fluid tight seal with the inner surface 302 of the vessel 300 and at least partially define the upper and lower volumes 306, 308 in the vessel 300. An etchant may be disposed in the upper volume 306 and contacted with the sacrificial plate 202 to initiate etching. In another implementation, the etchant may be disposed in the lower volume 308 and/or the upper volume 306. In at least one implementation, the vessel 300 and/or the etchant contained therein may be at least partially heated to facilitate the etching process. In another implementation, a current, such as an anodic or cathodic current, may be applied to the etchant to facilitate the etching process. In yet another implementation, the etchant may be sonicated to facilitate the etching process. After the sacrificial plate 202 and the article 120 are separated or substantially separated from one another, the support 310 may at least partially support the article 120 and/or the article 120 may be removed from the vessel 300.

It should be appreciated that any suitable etchant, or etchants in sequence, may be utilized. Suitable etchants may be those that selectively etch the sacrificial material at an etch rate greater than the respective materials utilized in the base 204 and/or the article 120. In an exemplary implementation, the base 204, 402 may be fabricated from aluminum or alloys thereof, and the sacrificial material of the sacrificial plate 202 may be copper, tantalum, alloys of either copper or tantalum, or combinations thereof. In such an implementation, a copper etchant, such as Cu APS-100, which is commercially available from Transene Company, Inc. of Danvers, MA, may be utilized to selectively etch the copper or copper alloys versus the aluminum or aluminum alloys. Other etchants may be or include aluminum etchants, tantalum etchants, chromium etchants, copper etchants, gallium etchants, germanium etchants, gold etchants, hafnium etchants, indium etchants, indium tin oxide etchants, iron oxide etchants, magnesium etchants, magnesium oxide etchants, niobium etchants, nichrome etchants, nickel etchants, palladium etchants, tin etchants, titanium etchants, tungsten etchants, Transene STS SF6/O2, one or more acids (e.g., sulfuric acid, hydrochloric acid, etc.), or the like, or combinations thereof.

In an exemplary implementation, the sacrificial plate 202 may be a composite. For example, the sacrificial plate 202 may be comprised of two or more materials, such as aluminum or alloys thereof and copper or alloys thereof (e.g., aluminum coated copper or copper coated aluminum). In such an implementation, the sacrificial plate 202 may be contacted with two or more etchants selective for any one or more of the materials. For example, the sacrificial plate 202 may first be contacted with a first etchant to etch a first material (e.g., copper or copper alloy) of the sacrificial plate 202, and subsequently contacted with a second etchant to etch a second material (e.g., aluminum or aluminum alloy) of the sacrificial plate 202.

Figure 4A:
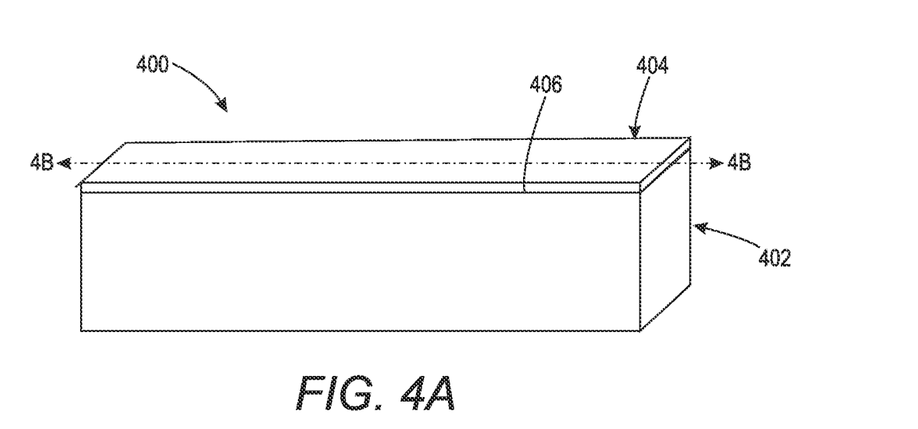
FIG. 4A illustrates a perspective view of another exemplary build plate that may be utilized in the 3D printer of FIG. 1, according to one or more implementations disclosed.
Figure 4B:
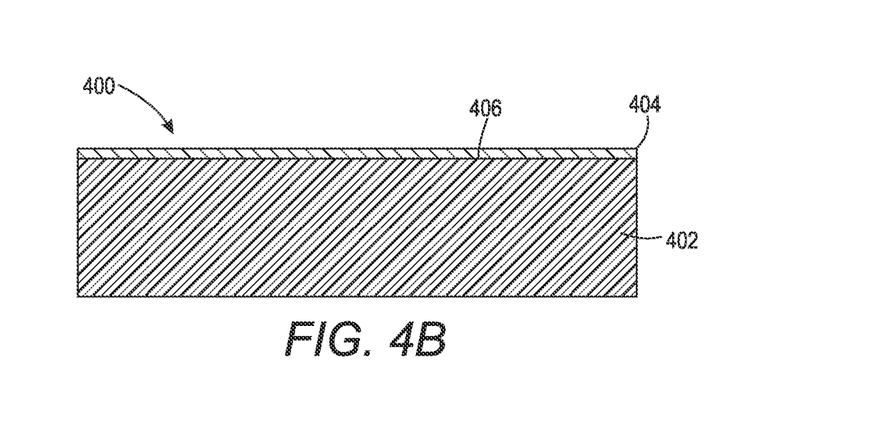
FIG. 4B illustrates a cross-sectional view of the exemplary build plate of FIG. 4A, according to one or more implementations disclosed.
Figure 4C:
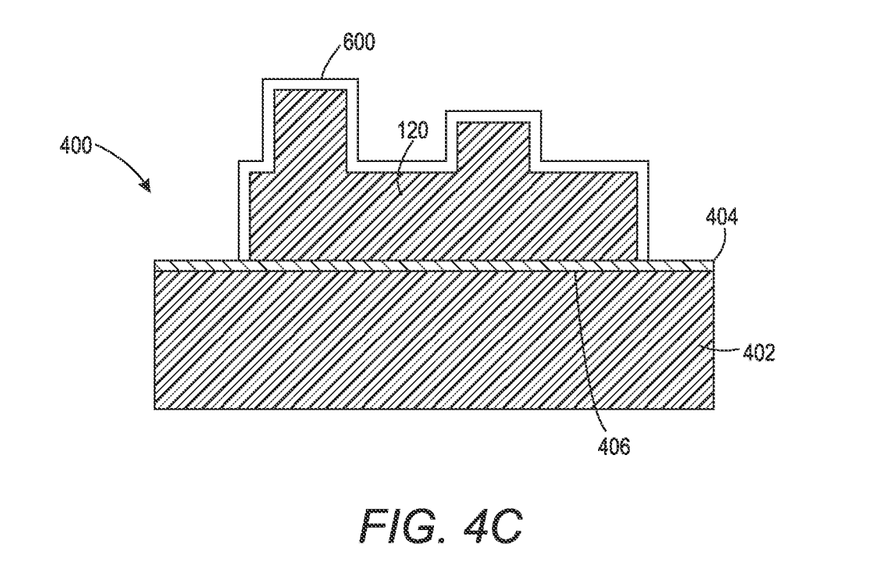
FIG. 4C illustrates a cross-sectional view of the build plate of FIG. 4A supporting a 3D printed article, according to one or more implementations disclosed.

FIG. 4A illustrates a perspective view of another exemplary build plate 400 that may be utilized in the 3D printer 100 of FIG. 1, according to one or more implementations. FIG. 4B illustrates a cross-sectional view of the exemplary build plate 400 of FIG. 4A, according to one or more implementations. FIG. 4C illustrates a cross-sectional view of the build plate 400 of FIG. 4A supporting the article 120, according to one or more implementations. As illustrated in FIGS. 4A-4C, the build plate 400 may include a base 402 and a sacrificial layer 404 disposed on or adjacent the base 402. The sacrificial layer 404 may be disposed adjacent at least a portion of the base 402 such that the sacrificial layer 404 at least partially covers a surface 406 thereof. For example, as illustrated in FIGS. 4A-4C, the sacrificial layer 404 may be disposed on or adjacent a top surface 406 of the base 402. It should be appreciated that the base 402, the sacrificial layer 404, and the article 120 may be fabricated from the same materials as the base 204, the sacrificial plate 202, and the article 120, respectively, as discussed above with reference to FIGS. 2A-2C.

The sacrificial layer 404 and the base 402 may be coupled with one another such that they provide a single monolithic build plate 400. For example, the sacrificial layer 404 may be disposed or otherwise deposited on the base 402 via any suitable method to thereby provide a coating or a layer on the base 402. For example, the sacrificial layer 404 may be electroplated, sputtered, welded, electroless plated, chemically bonded, dip coated, or the like, on the base 402 to thereby provide the build plate 400. The sacrificial layer 404 may have a thickness of from about 0.1 µm to about 100 µm. For example, the sacrificial layer 404 may have a thickness of from about 0.1 µm, about 0.5 µm, about 1 µm, about 5 µm, about 10 µm, about 30 µm to about 40 µm, about 60 µm, about 80 µm, or about 100 µm. In other implementations, the sacrificial layer 404 has a thickness ranging from about 0.1 mm to about 5 mm.

In an exemplary operation of the 3D printer 100 with continued reference to FIGS. 1 and 4A-4C, the sacrificial layer 404 may be deposited or disposed on the surface 406 of the base 402 via any suitable process (e.g., electroplating, sputtering, etc.) to fabricate the build plate 400, as illustrated in FIG. 4A. The 3D printer 100 may then fabricate and affix the article 120 on the build plate 400 adjacent the sacrificial layer 404 thereof, as illustrated in FIG. 4C. After fabricating the article 120 on the build plate 400, the article 120 may be separated from the base 402 of the build plate 400, and the base 402 may be reused by depositing another sacrificial layer 404. The article 120 may be separated from the base 402 of the build plate 400 via one or more processes. The build plate 400 may contain channels or pores (not shown) to allow etchant access to the sacrificial layer 404. For example, the base 402 of the build plate 400 may define through holes or channels extending therethrough (e.g., via a thickness) and capable of or configured to allow fluid communication from a bottom surface to the surface 406 of the base 402, thereby providing access to the sacrificial layer 404. The channels may have any size and/or shape, which may be at least partially dependent on the size and/or shape of the article 120 and/or the sacrificial layer 404. The etchant can be circulated through the base 402 to and from the sacrificial layer 404 in cycles. The same channels and pores may also be utilized for vacuum clamping the sacrificial layer 404 to the base 402. Examples of a build plate comprising a base with channels and an optional porous layer that can be used for etchant access and/or for employing vacuum pressure to bond the sacrificial layer 404 to the base 402 is shown and described below with respect to FIGS. 5 and 6.

In at least one implementation, the article 120 may be separated from the base 402 of the build plate 400 by any process capable of or configured to etch the sacrificial layer 404. For example, the sacrificial layer 404 and the base 402 may be separated from one another by wet or chemical etching with a liquid etchant or reactant, gaseous etching with a gas or vaporized etchant or reactant, plasma etching with a plasma formed with a gaseous etchant or reactant, electrochemical etching or electroetching, or any combination thereof. It should be appreciated that any etching process may be utilized and the particular etching process selected may be at least partially determined by the etch rate (e.g., Å/min, cycles, etc.), geometry (e.g., size and/or shape) of the article 120 and/or the sacrificial layer 404, exposed surface of the article 120 and/or the sacrificial layer 404, selectivity of the etching for the sacrificial layer 404 relative to the base 402 and/or the article 120, or the like, or any combination thereof.

In an exemplary implementation, the sacrificial layer 404 and the base 402 are separated from one another by wet or chemical etching. For example, the sacrificial layer 404 may be contacted with an etchant to remove portions or layers thereof to thereby separate or release the article 120. In at least one implementation, the build plate 400 including the base 402 and the sacrificial layer 404 having the article 120 coupled therewith may be at least partially immersed in the etchant disposed in a vessel. It should be appreciated that the vessel may be similar to the vessel 300 described above with respect to FIG. 3.

Figure 5:
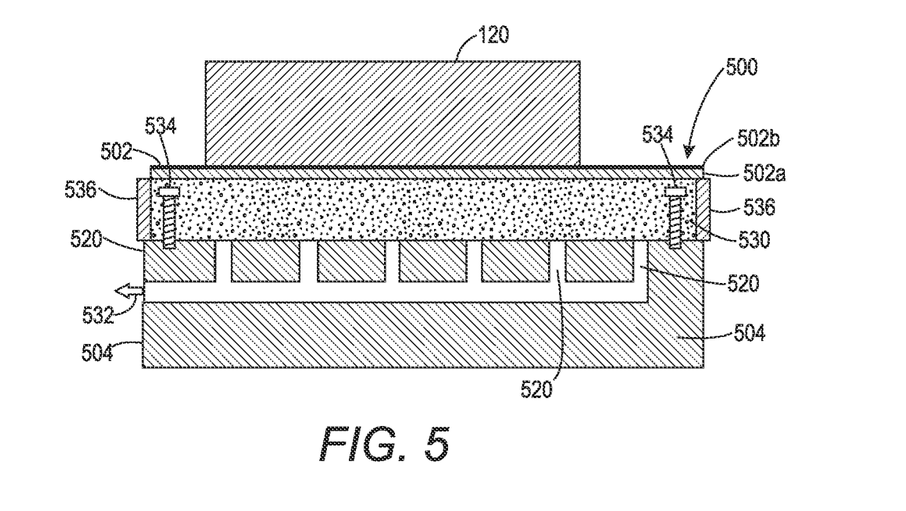
FIG. 5 illustrates a schematic, cross-sectional view of an exemplary build plate that may be utilized in the 3D printer of FIG. 1, according to one or more implementations disclosed.

FIG. 5 illustrates a schematic side view of an exemplary implementation of a build plate 500. The build plate 500 comprises a base 504 comprising a base material and one or more vacuum channels 520 disposed therein. An optional porous layer 530 comprising a porous network is disposed proximate to, and in fluid communication with, the one or more vacuum channels 520. A removable plate, which can be, for example, a sacrificial plate 502, is disposed proximate the porous layer 530. A vacuum (as indicated by arrow 532) can be applied to the vacuum channels 520 and through the porous layer 530 so as to vacuum clamp the sacrificial plate 502 to the build plate 500 during operation of the build plate. The vacuum 532 can be partially or entirely released when it is desired to separate the sacrificial plate 502 and the base 504. In this manner, the build plate 500 can act as a vacuum chuck for the article 120 as it is being built during the additive manufacturing process.

The base 504 can comprise any of the materials described herein for use in the base 204, 402. The channels 520 can comprise hollow pathways, or conduits, in the base 504. The channels 520 can be fluidly connected to a vacuum source (not shown) to thereby allow for fluid flow between the vacuum source and the optional porous layer 520 and/or a surface of the base 504 that is proximate to the sacrificial plate 502. In this manner a vacuum can be applied that is sufficient to clamp, or bond, the sacrificial plate 502 to the build plate 500. The channels 520 can be configured in any suitable manner that will allow the base 504 and the sacrificial plate 502 to be temporarily bonded with one another while the vacuum is applied through the channels 520.

The porous layer 530 comprises an open porous network that allows fluid flow therethrough. The porosity of the layer 530 can be any amount that allows suitable fluid flow for the vacuum clamping. Example ranges of porosity are from about 1 vol. % to about 80 vol. %, about 25 vol. % to about 75 vol. %, or about 40 vol. % to about 60 vol. %. The porous layer 530 can comprise any porous material that can withstand the process conditions, such as temperatures and vacuum pressures of the 3D printing process, and/or, in embodiments where the porous layer is exposed to an etchant, is suitably resistant to the etchants employed for etching the sacrificial material when separating the article 120 from the build plate 500, similarly as described herein with respect to the build plates of FIGS. 2 to 4. In an example, the porous layer 530 comprises a metal, such as any of the metals described herein for use as the base materials. The porous layer 530 can comprise a material that is the same as, or different than, the base material of base 504. Illustrative metals (e.g., pure metals and alloys) that can be used for the porous layer may be or include, but are not limited to, aluminum, aluminum alloys, brass, bronze, chromium, chromium alloys, cobalt, cobalt alloys, cobalt-chrome alloys, copper, copper alloys, iron, iron alloys (e.g., INVAR, steel), nickel, nickel alloys (e.g., INCONEL®), nickel-titanium alloys (NITINOL), stainless steel, tin, tin alloys, titanium, titanium alloys, gold, gold alloys, silver, silver alloys, molybdenum, molybdenum alloys, tungsten and tungsten alloys, or any combination thereof. Pore sizes of the porous layer can range from, for example, about 0.1 micron to about 1000 microns, or about 0.5 micron to about 500 microns, or about 1 micron to about 100 microns. Porous plate thickness can range, for example, from about 1 mm to about 50 mm.

The porous layer 530 can be detachably coupled to the base 504 in any desired manner, such as by using mechanical fasteners 534, as illustrated in FIG. 5. Examples of suitable mechanical fasteners include, but are not limited to, one or more bolts, studs and nuts, clamps, threaded studs, and/or any other known mechanical fasteners. Alternatively, both the porous layer 530 and the sacrificial plate 502 can be detachably coupled to the base 504 using vacuum pressure supplied via channels 520, as illustrated, for example, in FIG. 6. In still other embodiments, the porous layer can be permanently bonded to, or an integral part of, the base 504. If bonding is employed it can be accomplished in any suitable manner, such as by employing adhesives, welding or metallurgical bonding techniques. The porous layer and the base 504 could also be made from a single piece of metal if desired.

Figure 6:
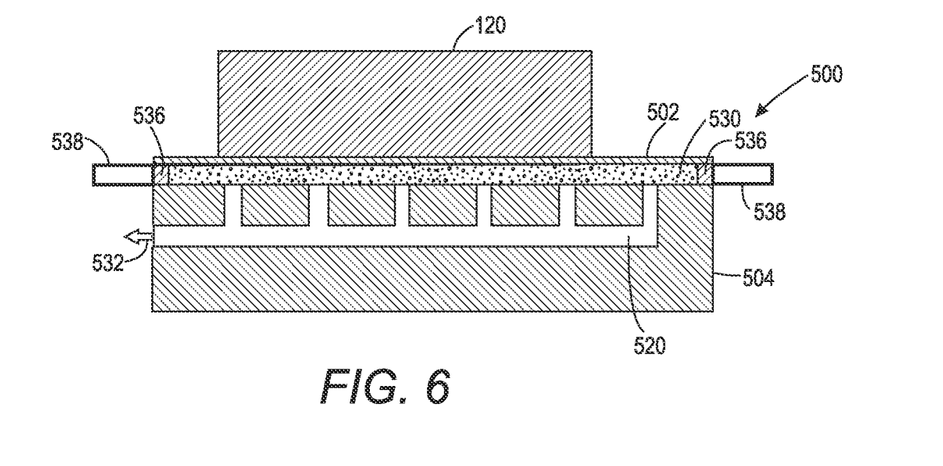
FIG. 6 illustrates a schematic, cross-sectional view of an exemplary build plate that may be utilized in the 3D printer of FIG. 1, according to one or more implementations disclosed.

In an implementation, the porous layer further comprises a non-porous sidewall 536 disposed proximate the periphery of the porous layer, as illustrated, for example, in FIGS. 5 and 6. The non-porous sidewall 536 can provide support for one or more optional handles 538 (FIG. 6). The handle 538 can be employed by an operator of the device, a robotic mechanism or other device for ease of handling and/or for supporting the detachable porous layer 530 and the sacrificial plate during pre- and post-printing operations, such as when the sacrificial plate is being clamped onto the base 504, or being removed from the base 504 for etching.

In an embodiment, the base 504 is heated. Any suitable technique for heating can be employed, such as by employing a heating element 540 (FIG. 1) or other heater mechanism either within the base 504 or proximate to the base 504.

In an implementation, the sacrificial plate 502 can be comprised entirely of sacrificial material, such as illustrated in FIG. 6. Alternatively, as illustrated in FIG. 5, the sacrificial plate 502 can comprise a support layer 502*a* of a first material and a sacrificial layer 502*b* of sacrificial material that is different than the first material and that is disposed over the support layer 502*a*. The article 120 can then be printed in physical contact with the sacrificial layer 502*b* (FIG. 5) or the sacrificial material of sacrificial plate 502 (FIG. 6). With respect to FIG. 5, the sacrificial layer 502*b* can be etched, thereby separating the sacrificial plate 502 of FIG. 5 from the base 504 in the same manner as described for sacrificial plate 202 and/or sacrificial layer 404. The two-layer arrangement of the sacrificial plate 502 allows the support layer 502*a* to provide structural integrity and rigidity to the sacrificial plate 502, while also allowing the sacrificial layer 502*b* to be any suitable thickness, such as relatively thin thicknesses that would not provide the desired rigidity for the base plate if used alone, without the support of the support layer 502*a*. The support substrate 502*a* may be reused by depositing another sacrificial layer 502*b*. With respect to the embodiment illustrated in FIG. 6, the entire sacrificial plate 502, or substantially the entire sacrificial plate 502, can be etched away by the etching process.

Figure 7:
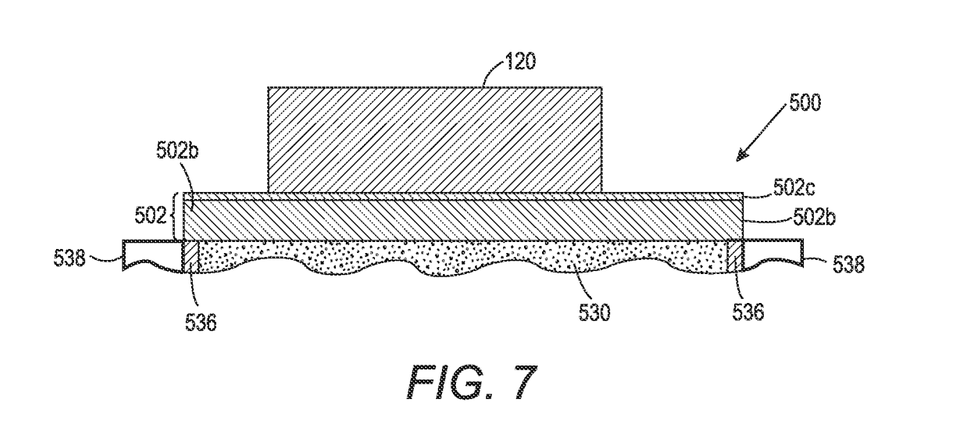
FIG. 7 illustrates a schematic, cross-sectional view of an upper portion of an exemplary build plate that may be utilized in the 3D printer of FIG. 1, according to one or more implementations disclosed.

In yet another embodiment, the sacrificial plate 502 can comprise a sacrificial layer 502*b* of sacrificial material and an etch stop layer 502*c*, as shown in FIG. 7. The article 120 can be printed in physical contact with the etch stop layer 502*c*. Employing such an etch stop layer 502*c* can aid in avoiding unwanted etching of article 120 during removal of the sacrificial layer 502*b*. The material of the etch stop layer 502*c* and the etchant are chosen so that the etch stop layer 502*c* etches more slowly than the sacrificial material of sacrificial layer 502*b*. In an embodiment, the etch stop layer 502*c* can have a thickness that is thinner than the sacrificial layer 502*b*. For example, the etch stop layer 502*c* can have a thickness that is about 0.002% to about 20%, or about 0.1% to about 10%, or about 1% to about 5%, of the total thickness of the sacrificial plate 502, while the sacrificial layer 502*b* can have a thickness that is about 80% to about 99.98%, or about 90% to about 99% of the total thickness of the sacrificial plate 502. As examples, the etch stop layer 502*c* can have a thickness ranging from about 0.1 micron to about 50 microns, or about 1 micron to about 20 microns.

The sacrificial layer 502*b* (FIGS. 5 and 7) and the sacrificial plate 502 (FIG. 6) can be etched in any suitable manner. For example, sacrificial layer 502*b* can be etched by employing any of the etching processes described herein, such as the etching process described for sacrificial plate 202 and/or sacrificial layer 404.

With respect to the embodiments with etch stop layers 502*c*, as illustrated in FIG. 7, after removing the sacrificial layer 502*b*, the relatively thin etch stop layer 502*c* can then be removed by any suitable manner, or alternatively can be allowed to remain on the article 120. For example, the etch stop layer can be removed by a further etching process that is appropriate for etching the etch stop material. For example, where the sacrificial layer 502b is removed using an electrochemical etch with a first voltage, the etch stop layer 502c can be removed with an electrochemical etch with a second voltage that is higher than the first voltage. Techniques for employing a desired voltage during electrochemical etching are well known and other suitable techniques can be later developed. Alternatively, a first chemical etchant can be used to remove the sacrificial layer 502b (e.g. without an applied voltage) and a second chemical etchant that is different from the first chemical etchant can be used to remove the etch stop layer 502c. In yet other embodiments, the sacrificial layer 502b can be removed by etching and the etch stop can be removed by a mechanical technique, such as by sanding, grinding or any other technique.

The sacrificial plates 502 described herein can be employed interchangeably with any of the build plates 500 described herein. Still other embodiments can be imagined. Referring to FIG. 7, for example, a support layer 502a (not shown in FIG. 7) can be disposed either between the sacrificial layer 502b and the porous layer 530, or between the sacrificial layer 502b and the etch stop layer 502c, in order to provide stiffness and/or mechanical support to the sacrificial plate 502.

The sacrificial plate 502 (FIG. 6) and sacrificial layers 502b (FIGS. 5 and 7) can comprise any of the sacrificial materials described herein. In an embodiment, the sacrificial material is chosen from materials (e.g., metal oxides and metals) that are the same as, or different than the base material of base 504 and/or the material of porous layer 530. In embodiments, the sacrificial material is chosen to be different than the base material of base 504 and/or the material of porous layer 530 to allow the desired etch rate ratios of the sacrificial material relative to the base and/or porous layer materials to be achieved. The etch rate ratios for the implementations described with respect to FIGS. 5 to 7 can be the same as the etch rate ratios provided for any of the other implementations described herein.

In embodiments where a support layer 502a is employed, the support layer 502a can comprise any desired material, including metals such as iron, iron alloys such as steel, copper, copper alloys, zinc, zinc alloys, brass and other pure metals or alloys. In an embodiment where a etch stop layer 502c is employed, any suitable etch stop material with a relatively slow etch rate compared with the material of the sacrificial layer 502b can be employed. For example, the etch rate ratio of the sacrificial materials utilized in the sacrificial layer 502b relative to the respective materials utilized in the etch stop layer 502c can be any of the etch rate ratios described herein. In an example, the etch stop layer 502c can comprise one or more materials chosen from gold, gold alloys, silver, silver alloys, platinum, platinum alloys, chromium, chromium alloys, chromium oxides, brass, copper, copper alloys, copper oxide and iron oxide. Composite etch stop layers can also be employed, such as iron oxide coated with one or more materials chosen from chromium, chromium alloys, chromium oxides, gold, gold alloys, silver, silver alloys, platinum and platinum alloys. In an example, a sacrificial layer 502b comprises steel and the etch stop layer 502c comprises a material chosen from iron oxide, gold or silver, or an alloy of one or both of gold and silver.

The sacrificial plate 502 can have any suitable thickness, such as, for example, any of the thicknesses described herein for the sacrificial plate 202 and/or sacrificial layer 404. In an embodiment, the specific thickness chosen can provide a desired stiffness for the sacrificial plate 502. The thickness chosen can depend on the materials employed, among other things. For example, the sacrificial plate 502, whether as a single layer or as multiple layers 502a, 502b and/or 502c, can have a total thickness ranging from about 0.1 mm to about 5 mm. A relatively stiff plate can avoid buckling of the sacrificial plate during acceleration of the build plate while printing, thereby providing improved support for the article 120. Buckling of the sacrificial plate 502 can cause build part displacement and tilting, which in turn results in erroneous part building and/or premature part release. Similarly thermal expansion mismatch between a mechanically clamped plate and stage can result in plate buckling. The threshold for buckling is given by the Euler buckling formula $P \sim EI/L^2$ where P is the critical load, E is the Young's modulus, I is the moment of inertia and L is the distance between pinning points. Steel, for example has $E \sim 200$ GPa. Thus, the useful stiffness values will depend on plate thickness, Young's modulus, pinning dimensions, and so forth. Based on these considerations, useful materials for the sacrificial plate 502 have a Young's modulus ranging, for example, from about 50 GPa to about 300 GPa. In an embodiment where the interposer plate comprises two or more layers, at least one of the layers (e.g., the support layer and/or the sacrificial layer) can comprise a Young's modulus within the ranges disclosed herein.

After build completion the vacuum 532 is released (e.g., vacuum pressure 532 is increased to about atmospheric pressure) and the temperature is lowered (e.g., to about room temperature). The sacrificial plate 502 and article 120 (and optionally the porous layer 530) are removed from the base 504. The article 120 is then removed from the sacrificial plate 502 using an etchant which selectively etches the sacrificial material without substantially etching (e.g., no etching) of the article 120.

An alternative embodiment is also contemplated in which any of the vacuum clamping systems described herein are employed in a 3D printer, such as the vacuum clamping systems described above with respect to FIGS. 5 to 7, except that instead of the removable plate being a sacrificial plate 502, the removable plate is an interposer plate that does not comprise a sacrificial material. For example, the removable plate can comprise the same material as the base 504, the porous layer 530 and/or the article 120, or any of the materials described herein for support layer 502a, with no sacrificial material disposed thereon. If such an interposer plate is employed, conventional techniques or other techniques not yet developed can be employed instead of etching for removing the article 120 from the interposer plate.

Employing a vacuum clamping system as described herein can provide certain advantages for 3D printing. For example, thermal expansion mismatch between the article 120 and build plate 500 is accommodated by slipping at the non-rigid vacuum interface between the sacrificial plate 502 and the upper surface of the base 504 or the optional porous layer 530. This can result in reduced thermal stress on the article 120 and/or the sacrificial plate 502 during processing.

In an implementation, a coating may optionally be disposed on or about one or more of the article 120, the base 204, 402, 504 the sacrificial layer 404, 502b and the sacrificial plate 202, 502 prior to etching. The coating may be capable of, or configured to, at least partially protect a respective surface of the article 120, the base 204, 402, the sacrificial layer 404, and/or the sacrificial plate 202 from the etchant. The coating may be a temporary coating, such as a conformal coating. For example, the coating may be a thin polymeric film capable of, or configured to, conform to the contours of the article 120, the base 204, 402, the sacrificial layer 404, and/or the sacrificial plate 202 to protect the respective surfaces thereof. An example of such a coating configured to protect the article 120 is shown as coating 600 in FIG. 4C. The coating may be applied in any suitable process or methods. For example, the coating may be applied via brushing, spraying, dip coating, or the like, or any combination thereof. Illustrative materials utilized for the coating may be or include, but are not limited to, acrylics, silicones, urethanes, parylene, or the like, or any combination thereof.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A build plate configured for use in a 3D printer, the build plate comprising:
    a base;
    a porous layer positioned on the base;
    and a removable plate, wherein the removable plate comprises a sacrificial layer, wherein the sacrificial layer comprises one or more protuberances that are integral with the sacrificial layer, wherein the protuberances extend through an entire dimension of the base, and etch stop layer positioned on the sacrificial layer, wherein the etch stop layer is thinner than the sacrificial layer, wherein the etch stop layer has a thickness from about 0.1% to about 10% of a total thickness of the removable plate, wherein the sacrificial layer has a thickness from about 90% to about 99.9% of the removable plate.

2. The build plate of claim 1, wherein the sacrificial layer comprises at least one sacrificial material chosen from a metal and metal oxide.

3. The build plate of claim 2, wherein the sacrificial material is disposed between the etch stop layer and the base.

4. The build plate of claim 3, wherein the etch stop layer comprises one or more materials chosen from gold, gold alloys, silver, silver alloys, platinum, platinum alloys, chromium, chromium alloys, chromium oxides, brass, copper, copper alloys, copper oxides and iron oxide.

5. The build plate of claim 1, wherein the removable plate comprises a support layer.

6. The build plate of claim 1, wherein the porous layer comprises a porous network disposed proximate to, and being in fluid communication with, the one or more vacuum channels.

7. The build plate of claim 6, wherein the base material comprises a first metal and the porous layer comprises a second metal, the first metal and the second metal being the same or different and being independently chosen from aluminum, aluminum alloys, brass, bronze, chromium, chromium alloys, cobalt, cobalt alloys, cobalt-chrome alloys, copper, copper alloys, iron, iron alloys, nickel, nickel alloys, nickel-titanium alloys, stainless steel, tin, tin alloys, titanium, titanium alloys, gold, gold alloys, silver, silver alloys, molybdenum, molybdenum alloys, tungsten and tungsten alloys.

8. The build plate of claim 7, wherein the removable plate further comprises a sacrificial material, the sacrificial material being different than one or both of the first metal and the second metal.

9. The build plate of claim 8, wherein the sacrificial material is a metal or metal oxide chosen from copper, copper alloys, copper oxide, tantalum, tantalum alloys, aluminum, aluminum alloys, chromium, chromium alloys, gallium, gallium alloys, germanium, germanium alloys, gold, gold alloys, hafnium, hafnium alloys, indium, indium alloys, indium tin oxide, iron, iron alloys, iron oxide, magnesium, magnesium oxide, niobium, niobium alloys, nichrome, nickel, nickel alloys, palladium, palladium alloys, tin, tin alloys, titanium, titanium alloys, tungsten and tungsten alloys.

10. The build plate of claim 6, wherein the porous layer further comprises a non-porous sidewall disposed proximate the periphery of the porous layer.

11. The build plate of claim 6, wherein the porous layer is removably disposed on the base, the porous layer further comprising one or more handles.

12. The build plate of claim 1, wherein the removable plate has a thickness, the thickness ranging from about 0.1 mm to about 5 mm.

13. The build plate of claim 1, wherein the removable plate comprises a material having a Young's modulus ranging from about 50 to about 300 GPa.

14. The build plate of claim 1, wherein the etch stop layer etches more slowly than the sacrificial layer.

15. The build plate of claim 1, wherein the sacrificial layer is configured to be removed using an electromechanical etch with a first voltage, and wherein the etch stop layer is configured to be removed with an electromechanical etch with a second voltage that is higher than the first voltage.

16. A three-dimensional (3D) printer, comprising: a printhead; a stage disposed proximal the printhead, the stage comprising a build plate, the build plate comprising: a base comprising a base material and defining one or more vacuum channels therethrough; a porous layer positioned on the base; and a removable plate positioned on the porous layer, wherein the removable plate comprises a sacrificial layer positioned on the porous layer, and an etch stop layer positioned on the sacrificial layer, wherein the etch stop layer is thinner than the sacrificial layer, wherein the sacrificial layer comprises one or more protuberances that are integral with the sacrificial layer, wherein the protuberances extend through an entire dimension of the base, and wherein the removable plate is configured to be detachably coupled to the base using vacuum pressure supplied through the one or more vacuum channels and the porous layer; and a computer controlled motion system that allows the printhead and the stage to move in three dimensions relative to each other during operation of the 3D printer.

17. The 3D printer of claim 16, wherein the sacrificial layer comprises at least one sacrificial material chosen from a metal and metal oxide.

18. The 3D printer of claim 17, wherein sacrificial layer is disposed between the etch stop layer and the base.

19. The 3D printer of claim 16, wherein the porous layer comprises a porous network disposed proximate to, and being in fluid communication with, the one or more vacuum channels.

20. The 3D printer of claim 16, wherein a porosity of the porous layer is from about 1 vol % to about 80 vol %.

21. The 3D printer of claim 16, wherein the porous layer comprises a porous network through which the vacuum pressure is communicated, and wherein the one or more channels are not defined in the porous layer.

22. The 3D printer of claim 14, wherein the porous layer is coupled to the base using one or more mechanical fasteners, and wherein the removable plate is not coupled to the base or the porous layer using the one or more mechanical fasteners.

* * * * *